Dec. 30, 1941.  H. T. KRAFT  2,268,509
CLUTCH
Filed June 14, 1940  4 Sheets-Sheet 1

INVENTOR
Herman T. Kraft
BY
Evans + McCoy
ATTORNEYS

Dec. 30, 1941.  H. T. KRAFT  2,268,509
CLUTCH
Filed June 14, 1940  4 Sheets-Sheet 2

INVENTOR
Herman T. Kraft
BY Evans + McCoy
ATTORNEYS

Dec. 30, 1941.   H. T. KRAFT   2,268,509
CLUTCH
Filed June 14, 1940   4 Sheets-Sheet 3
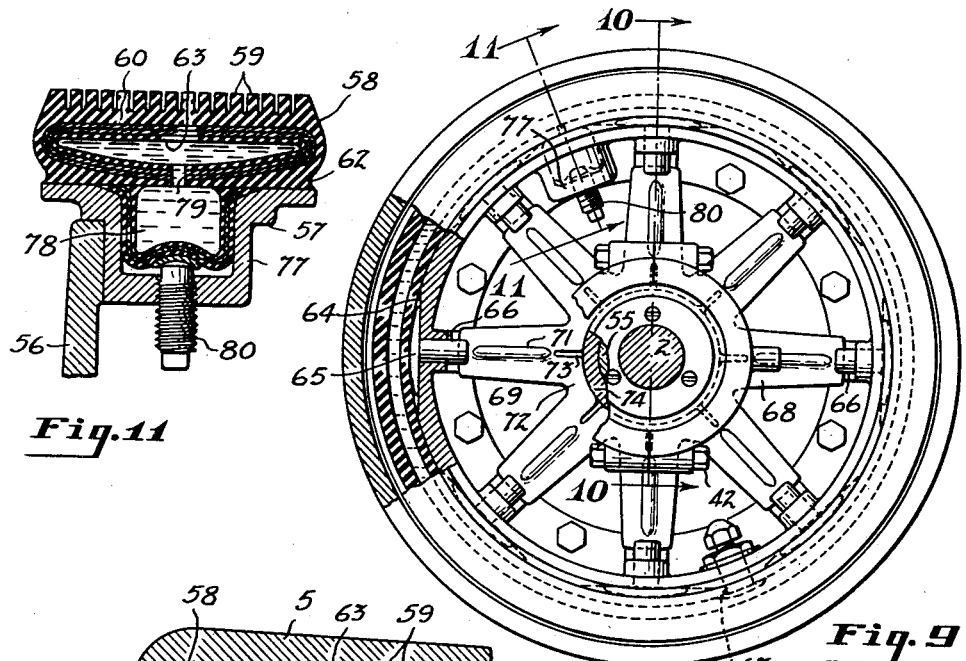
Fig.11
Fig.9
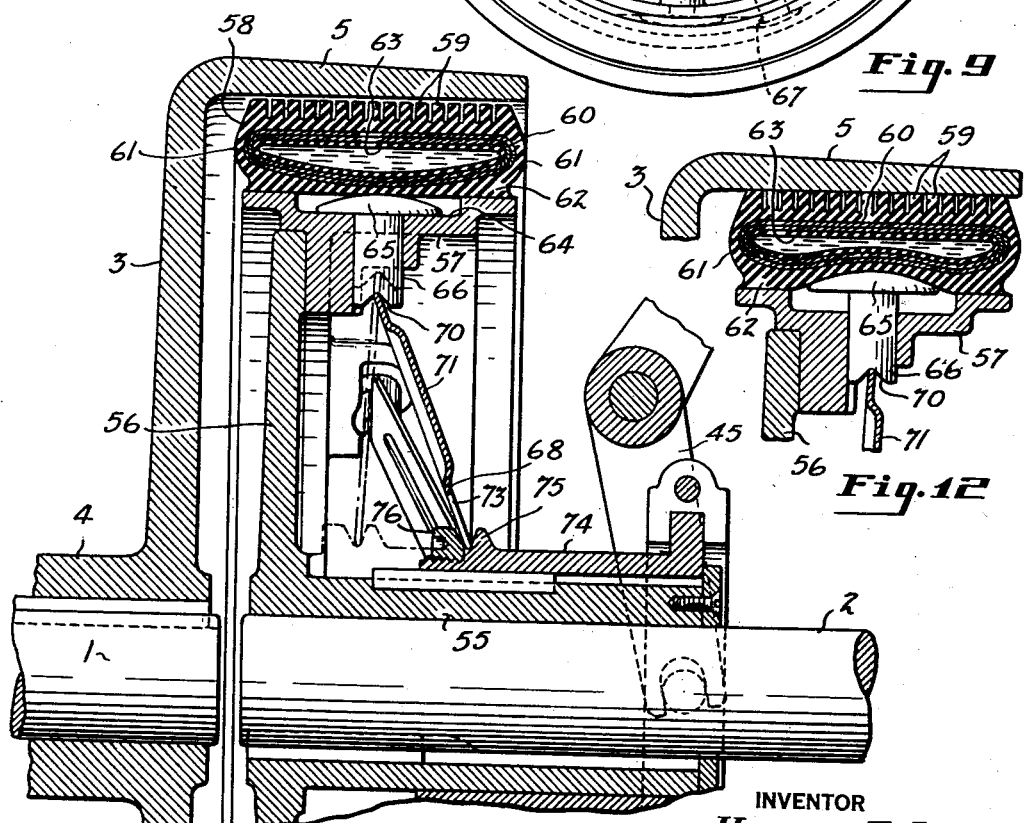
Fig.10
Fig.12
INVENTOR
*Herman T. Kraft*
BY
*Evans + McCoy*
ATTORNEYS Dec. 30, 1941.    H. T. KRAFT    2,268,509
CLUTCH
Filed June 14, 1940    4 Sheets-Sheet 4
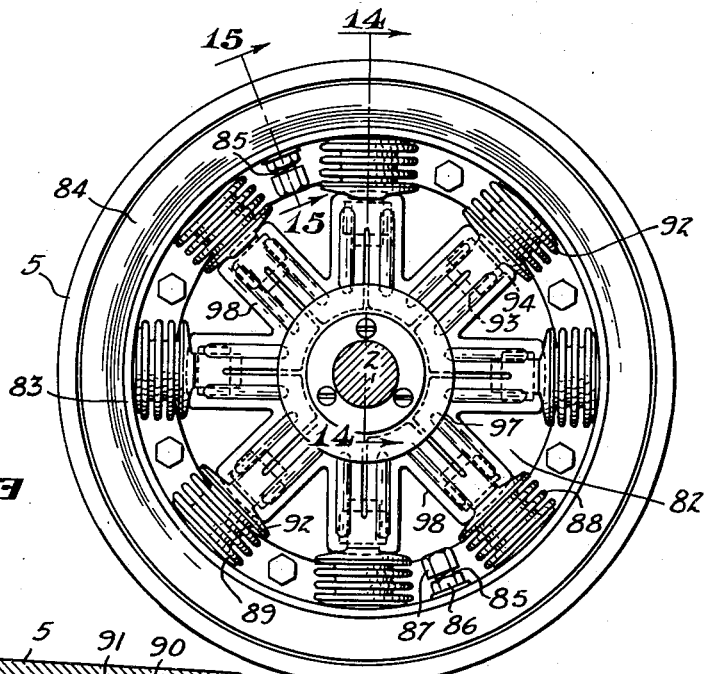
Fig.13
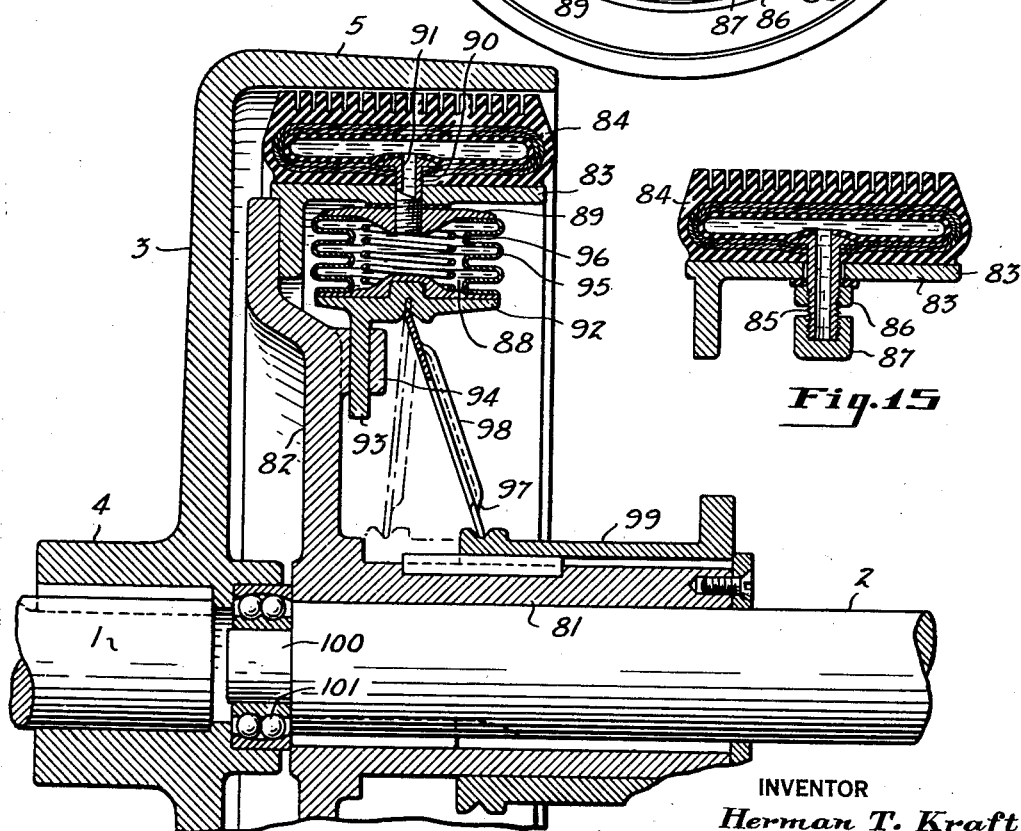
Fig.14
Fig.15
INVENTOR
Herman T. Kraft
BY Evans + McCoy
ATTORNEYS Patented Dec. 30, 1941

2,268,509

UNITED STATES PATENT OFFICE 2,268,509

CLUTCH

Herman T. Kraft, Akron, Ohio, assignor to The General Tire & Rubber Company, Akron, Ohio, a corporation of Ohio Application June 14, 1940, Serial No. 340,581

13 Claims. (Cl. 192—88)

This invention relates to clutches for connecting rotatable driving and driven members which are mounted substantially in axial alignment, and particularly to clutches of the drum type in which the driving connection is established by means of an expansible shoe engageable with the interior of the drum.

Expansible shoe clutches have heretofore been made in which the expansible shoe was in the form of an annular pneumatic tube adapted to be expanded into engagement with its drum by admitting air under pressure to the interior of the tube, and to be disengaged from the drum by exhausting air from the interior of the tube.

The present invention has for an object to provide an annular expansible shoe having a sealed chamber filled with fluid and adapted to be expanded and contracted without admitting fluid to or withdrawing fluid from the fluid chamber.

It is also an object of the invention to provide an annular liquid filled shoe which has a smaller range of expansion and contraction and which is better adapted for use in drum type clutches of smaller sizes than those to which the pneumatic type shoes are applicable.

A further object is to provide an expansible hydraulically actuated annular shoe which serves as a flexible torque transmitting member and which is so constructed that it can accommodate itself during operation to relative movements of the driving and driven members, such as those due to a slight misalignment of the driving and driven members.

A further object is to provide means for subjecting the drum engaging shoe to hydraulic pressure through substantially its entire area of engagement with the drum.

A further object is to provide the hollow annular expansible liquid filled shoe with means for applying pressure to the interior portions thereof to distort the same and cause the outer peripheral portions of the shoe to be expanded by the confined body of liquid into engagement with the drum.

A further object is to provide means for adjusting the shoe to position the outer peripheral portion thereof with respect to the drum and to control the range of movement of the peripheral drum engaging portion of the shoe.

A further object is to provide an actuator for applying pressure to the shoe, which is so constructed and arranged that it is automatically held in shoe engaging position when shifting to that position.

With the above and other objects in view the invention may be said to comprise the clutch as illustrated in the accompanying drawings hereinafter described and particularly set forth in the appended claims, together with such variations and modifications thereof as will be apparent to one skilled in the art to which the invention pertains. Reference should be had to the accompanying drawings, in which:

Fig. 9 is a side elevation of another modification of the invention;

Fig. 10 is a section on a somewhat enlarged scale taken on line 10—10 of Fig. 9;

Fig. 11 is a section taken on the line indicated at 11—11 in Fig. 9;

Fig. 12 is a sectional view similar to Fig. 10 showing the shoe in expanded position;

Fig. 13 is a side elevation showing a further modification of the clutch;

Fig. 14 is an axial section taken on the line indicated at 14—14 in Fig. 13; and Fig. 15 is an axial section taken on the line indicated at 15—15 in Fig. 13.

Figure 3:
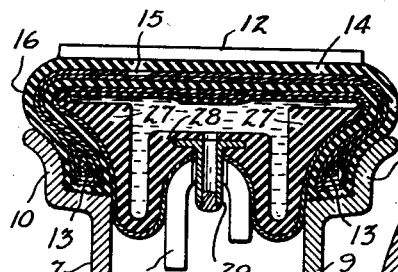
Fig. 3 is a fragmentary axial section on an enlarged scale taken on the line indicated at 3—3 in Fig. 1.
Figure 4:
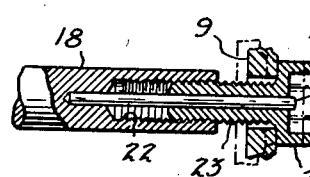
Fig. 4 is a fragmentary axial section on an enlarged scale through one of the shoe adjusting screws taken on the line indicated at 4—4 in Fig. 1.
Figure 1:
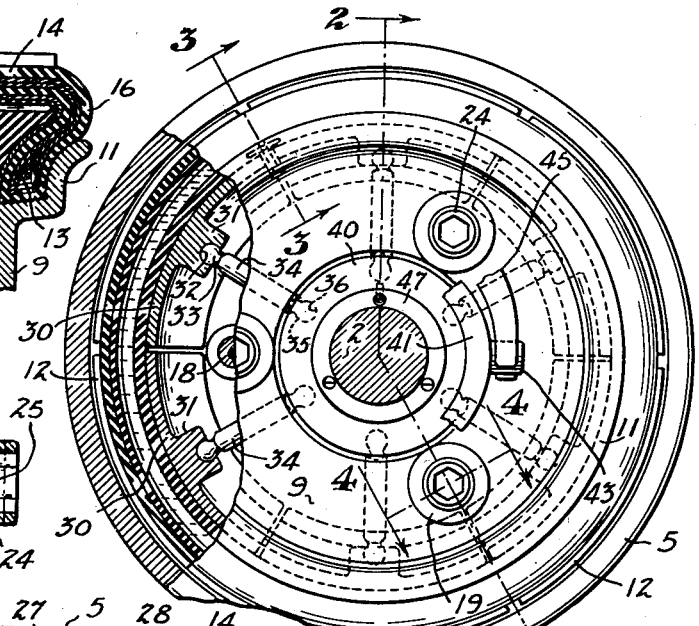
Figure 1 is a side elevation of a clutch embodying the invention with a portion thereof broken away and shown in transverse section.
Figure 2:
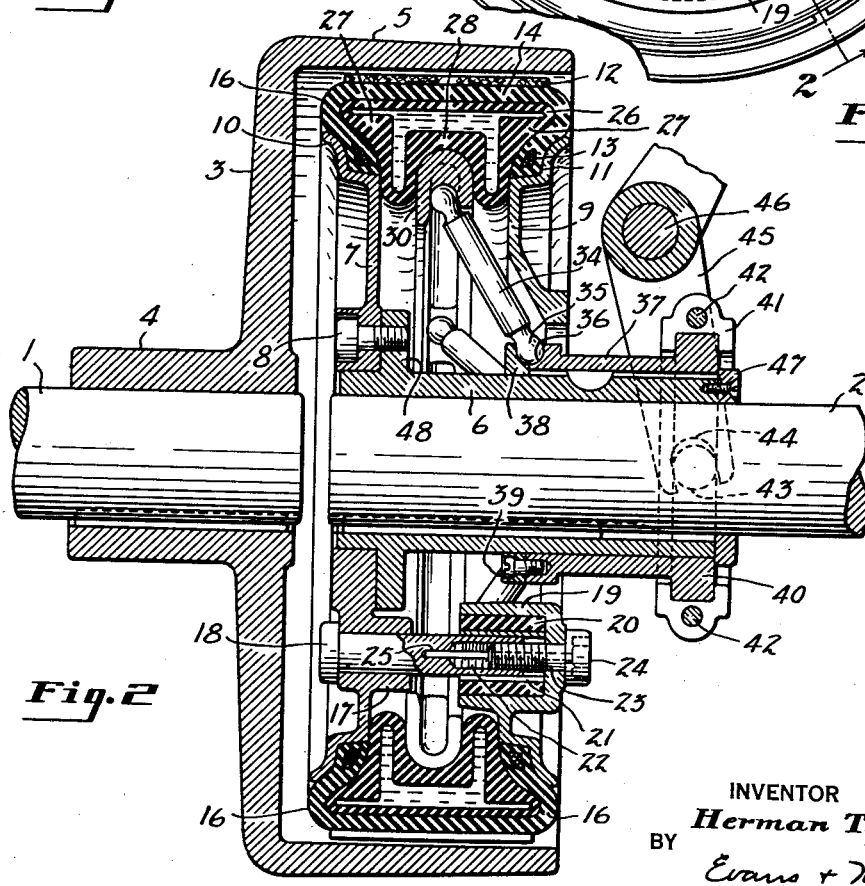
Fig. 2 is an axial section on a somewhat larger scale taken on the line indicated at 2—2 of Fig. 1.

As shown in Figs. 1 to 6 of the drawings, the clutch of the present invention is applied to axially aligned shafts 1 and 2, one of which is a driving shaft and the other a driven shaft. Shafts 1 and 2 are arranged end to end and upon the end of the shaft 1 there is mounted a drum 3 which has a hub 4 fixed to the shaft 1, and a cylindrical flange 5 which overhangs the adjacent shaft 2. The shaft 2 has a sleeve 6 fixed thereto and at the inner end of the sleeve a disk 7 is attached by means of bolts 8 to the sleeve 6. A second disk 9 is supported by the disk 7 and spaced outwardly therefrom. The disks 7 and 9 are provided at their peripheries with flanges 10 and 11 which provide seats for supporting an annular shoe casing 12 which has base portions 13 which may be in the form of wire reinforced inextensible beads seated on the flanges 10 and 11.

The annular shoe has a transversely flat thickened tread portion 14 which is closely adjacent the interior of the drum and which is movable into and out of engagement with the drum. The shoe casing 12 is a flexible and elastic rubber member similar to a pneumatic tire casing and is preferably provided with fabric reinforcement 15. The casing 12 has short outwardly bowed side walls 16 which provide flexible torque transmitting connections between the tread portion 14 and the base portions 13 attached to the disks 7 and 9. For supporting the outer disk 9 the inner disk 7 is provided with bosses 17 which receive bolts 18, which extend into enlarged sockets 19 formed in the body of the disk 9. The sockets 19 are provided with rubber bushings 20 provided with internal sleeves 21 which slidably receive the outer ends of the bolts 18. The bolts 18 are provided at their outer ends with threaded bores 22 which receive screws 23, which are provided with heads 24 engaging the exterior of the disk 9.

By adjusting the screws 23, the disk 9 may be moved toward or away from the disk 7 to move the outer side walls 16 of the shoe inwardly toward the inner wall thereof, or outwardly away from the inner wall to expand or contract the drum engaging tread 14 and position the same with respect to the interior of the drum. A pin 25 may be mounted in the end of each bolt 18 and extend axially through the screw 23 to the outer end thereof so as to provide a means for indicating the position of adjustment of the disk 9 with respect to the disk 7. The rubber bushings 20 facilitate adjustment of the disk 9 since they provide a yielding support for the disk 9 on the bolts 18 and lessen the bending stresses on the bolts and binding due to successive adjustment of the screws 23.

The casing 12 is provided with an inner tube 26 which is confined within the tread portion 14 and the side walls 16 of the casing and which serves as a container for an annular body of liquid within the casing. The interior wall of the inner tube has thickened portions 27 at opposite sides thereof directly within the side walls 16 and a central thickened portion 28 in a flexible portion of the tube between the disks 7 and 9. As shown in Fig. 3, the inner tube may be provided with a stem 29 providing a passage through which liquid may be introduced into the interior of the tube. After the required volume of liquid has been introduced into the tube the stem 29 may be sealed by any suitable means to confine the liquid in the tube.

A series of substantially channel shaped metal segments 30 are secured, preferably by vulcanization, to the central thickened portion 28 of the inner tube 26, and each of these segments is provided with a central lug 31. The lugs 31 are provided with sockets 32 to receive the outer ball ends 33 of thrust members 34, which have inner ball ends 35 mounted in sockets 36 on a sleeve 37 which is slidably mounted on the sleeve 6 and keyed thereto. To facilitate assembly of the thrust members 34, the socket 36 of the sleeve may be formed between an inner end portion of the sleeve 37 and a ring 38 attached to the inner end of the sleeve 37 by means of bolts 39.

Figure 5:
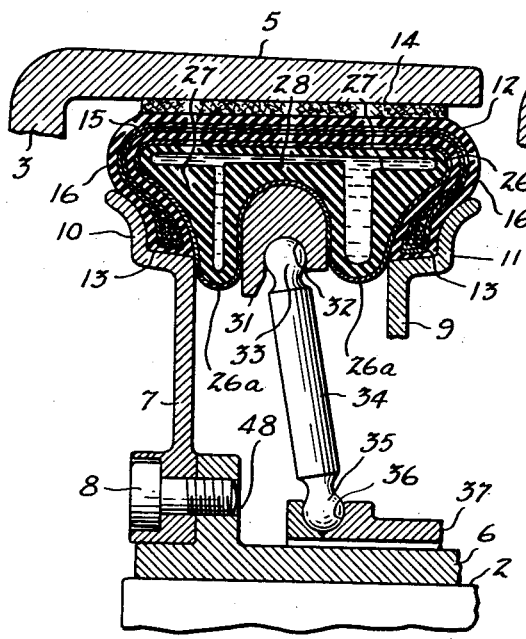
Fig. 5 is a fragmentary axial section showing the clutch actuating members in a position approaching the fully applied position.
Figure 6:
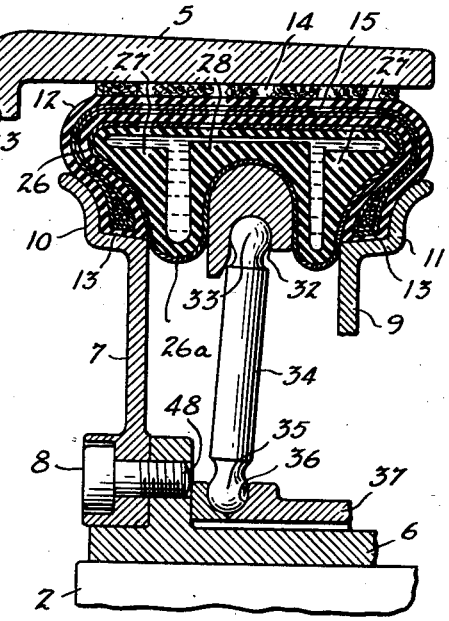
Fig. 6 is a view similar to Fig. 5 showing the clutch actuating members in the applied position.

When the sleeve 37 is moved axially on the sleeve 6, the inner ends of the thrust members 34 move with the sleeve while the outer ends, which are connected to the segments 30, are constrained to move radially. Thus an inward movement of the sleeve 37 causes the thrust members 34 to press the segments 30 radially outwardly, thereby exerting pressure on the interior wall of the inner tube 26, moving the same outwardly and creating pressure in the body of liquid within the tube which acts upon the tread portion 14 of the shoe casing to expand it into engagement with the interior of the drum. Any suitable means may be provided for shifting the sleeve 37 axially. A conventional form of shifter is herein shown, the sleeve 37 being provided with a flange 40 at its outer end which rotates within a shifter collar 41 which may be composed of two sections secured together by bolts 42. The collar 41 is provided with trunnions 43 which extend into slots 44 in the end of a forked lever 45 which rocks about a fixed pivot shaft 46. A stop ring 47 secured to the outer end of the sleeve 6 limits the outward movement of the sleeve 37 and the inner movement of the sleeve is limited by a flange 48 on the sleeve 6 adjacent its inner end. When the sleeve 37 is in its outermost position the shoe 12 is disengaged from the drum. As the sleeve 37 is moved inwardly the thrust members 34 are rocked toward a position perpendicular to the axis, as shown in Fig. 5. The outer ends of thrust member 34 are held to substantially radial movement because of the narrow spaces between the thickened portions 27 and 28 of the inner tube, and the outward movement of the central portion of the inner wall of the inner tube tends to reduce the fluid space within the tube, and since the liquid is incompressible, the pressure of the liquid is exerted upon the tread portion 14 of the shoe and forces the same radially outwardly toward the interior of the drum. The shape of the shoe is such that the cavity of the inner tube is transversely elongated so that a large volume of liquid is not required to fill the tube. Since the body of liquid provides a perfectly elastic medium between the pressure applying means and the shoe tread, the tread 14 is pressed outwardly with substantially uniform pressure throughout the circumference and width of the tread surface engaging the interior of the drum. The flange 48, which limits the inward movement of the sleeve 37, is so positioned that when the sleeve 37 has reached its inner limit of movement, the thrust members 34 have been moved slightly past their perpendicular position, as shown in Fig. 6, so that the radial inward pressure exerted upon the outer ends of the thrust members 34 by the elastic shoe transmits an inward thrust to the sleeve 37, which serves to retain the sleeve in the clutch engaging position until the sleeve 37 is shifted by the actuating mechanism toward releasing position.

The portions 26a of the interior wall of the inner tube 26 between the thickened portions 27 and 28 are relatively thin and flexible and these flexible portions project inwardly at opposite sides of the segments 30 between the segments 30 and the disks 7 and 9 and serve to prevent any substantial lateral movement of the segments. When the segments 30 are moved outwardly, their action upon the body of liquid is like that of a piston, and because of the fact that the area of the portion of the inner tube moved outwardly by the piston is much less than the area of the exterior wall of the inner tube which bears against the tread, the hydraulic pressure with which the tread is held against the interior of the drum is much greater than the pressure applied by the thrust members 34 to the segments 30. The flexible wall portions of the tube 26 depending upon opposite sides of the segments 30 have a slower outward movement than the segments 30 and offer little resistance to radial outward movements of the segments 30. The effective area of the outwardly moving inner wall of the tube is thus lessened and the multiplication of pressure against the tread is increased. By reason of the elasticity of the side walls of the shoe and of the portions 26a of the inner tube, they maintain substantially full pressure upon the tread when the thrust members 34 are moved past their dead center positions as shown in Fig. 6.

Figure 8:
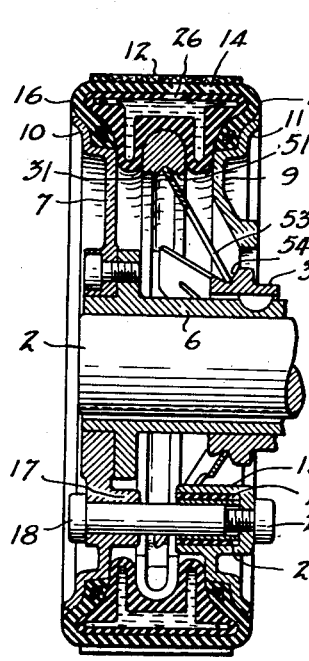
Fig. 8 is a section taken on the line indicated at 8—8 in Fig. 7.
Figure 7:
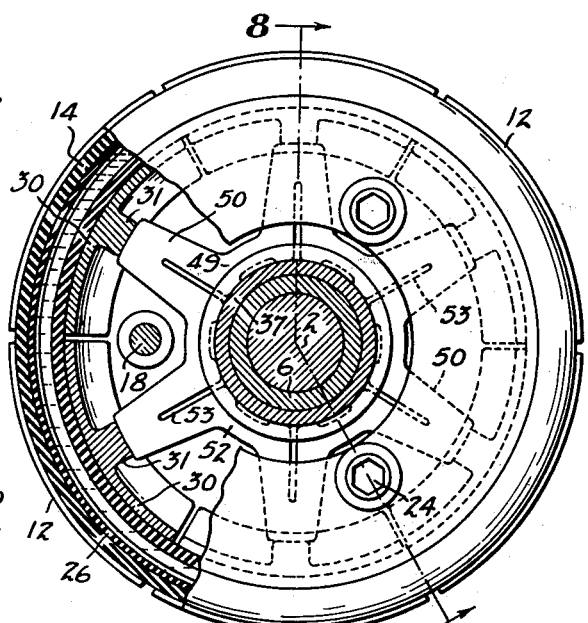
Fig. 7 is a side elevation showing a slightly modified construction in which the thrust applying members are in the form of arms formed in a one-piece flexible plate or disk.

Figs. 7 and 8 of the drawings show a clutch similar to that illustrated in Figs. 1 to 6 except that the thrust members 34 are replaced by a flexible steel plate or disk 49 of conical shape which is provided with radial arms 50 engaging the notches 51 in lugs 31 of the segments 30. The disk 49 has a continuous central portion 52 surrounding a central opening which receives the sleeve 37, and this central portion is provided with radial slots 53 which permit flexing of the inner portion of the disk upon axial movement of the sleeve 37. The central portion 52 of the disk engages the circumferential groove 54 at the inner end portion of the sleeve 37. The inner portion of the disk is constrained to move axially with the sleeve 37 while the outer ends of the arms 50, which engage the segments 30, are constrained to move substantially in a radial direction. As the sleeve 37 is moved inwardly from its clutch disengaging position, the inner portion 52 of the disk is moved axially, flattening the disk and causing the arms 50 to rock toward a position perpendicular to the axis of the clutch. As the sleeve 37 approaches its innermost position the disk is brought to a position in which it is substantially flat and disposed perpendicular to the axis. The inward limit of movement of the sleeve 37 is slightly past the position in which the disk is flat, so that the arms 50 have an inclination with respect to a plane perpendicular to the axis which is opposite to the normal inclination of the arms, so that the elastic shoe exerts a radial inward pressure on the outer ends of the arms, and holds the disk at its inner limit of movement until a positive outward force is exerted upon the sleeve 37 to move the same outwardly and release the clutch.

A further modification of the invention is shown in Figs. 9 to 12 of the drawings. In this modification a sleeve 55, having an integral flange 56 at its inner end which serves as a shoe supporting disk, is fixed to the shaft 2. At the periphery of the flange 56 there is secured an annular rim 57 which provides a base for an expansible tubular annular shoe 58, preferably in the form of a molded rubber tire, which is rigidly secured to opposite edge portions of the rim by suitable means such as by vulcanization to the rim. The tubular shoe 58 has a radial depth much less than its axial width so that the fluid cavity within the shoe is transversely elongated, being quite shallow radially but extending throughout the major portion of the width of the shoe. The shoe is formed with a thickened tread portion 59, the peripheral surface of which is transversely flat and which may be grooved to increase resistance to slip. The shoe is preferably provided with a fabric reinforcement 60 and has short outwardly bowed side walls 61 which provide a flexible torque transmitting connection between the tread and the supporting rim 57. The shoe has a flexible inner wall 62, central portions of which are free to move outwardly with respect to the rim 57. The shoe 58 may be provided with an inner tube 63. The rim member 57 is provided with recesses 64 at spaced points throughout its periphery and inwardly of the side edges thereof to which the shoe is attached. The recesses 64 provide chambers at the interior of the shoe to receive heads 65 of radially movable plungers 66 which are slidably mounted in the rim member and movable outwardly against the flexible inner wall 62 of the shoe.

The interior of the shoe 58 is filled with liquid which may be introduced through a stem 67, which may be sealed by any suitable means after the shoe cavity is filled with liquid. In the normal position of the shoe the tread 59 is supported adjacent to but spaced from the interior surface of the drum, the shoe being in the form to which it is vulcanized and having its peripheral surface close to and parallel with the interior drum surface. The plungers 66 are moved radially outwardly by means of a flexible steel disk 68 which is provided with arms 69 engaging notches 70 in the inner ends of the plungers 66. Each of the arms 70 may be stiffened by longitudinal rib 71 and these arms radiate from continucus central portion 72, which is sufficiently weakened by radial slots 73 to permit the disk to be forced by radial pressure from the conical form to a flat form. The central portion 72 of the disk is seated in a circumferential groove on a sliding clutch actuating sleeve 74, the groove being formed between a flange 75 on the sleeve 74 and a nut 76 on the inner end of the sleeve.

As in the modifications previously described, the shifter sleeve 74 is actuated by means of a lever 45 to push the central portion of the disk inwardly to a position slightly past the perpendicular position to simultaneously move the plungers 66 outwardly against the interior of the hollow shoe to expand the interior wall of the shoe, applying pressure to the liquid within the shoe, and thereby expanding the tread 59 into engagement with the interior of the drum.

In order to compensate for wear on the tread of the shoe, it is desirable to provide adjusting means independent of the clutch shifter to vary the position of the tread with respect to the drum and thereby control the range of movement of the tread so as to insure adequate pressure against the interior of the drum when the clutch is applied. As shown in Fig. 11, the rim 57 is provided with a deep recess or pocket 77 in which there is mounted a cup-shaped extension of the shoe which is attached to the interior wall of the shoe and provides a hollow fluid chamber 78 which communicates with the interior of the inner tube through an opening 79. At the base of the pocket or recess 77 there is mounted an adjustable plunger 80 which is radially disposed and which is externally threaded and screwed into a threaded opening in the rim. The outer end of the plunger 80 engages the inner wall of the chamber 78 and by adjusting the plunger 80 radially the pressure of the liquid within the shoe may be increased or decreased. If it is desired to reduce the clearance between the tread 59 and the interior of the drum, the plunger 80 is adjusted outwardly. If it is desired to increase the clearance, the plunger 80 is adjusted inwardly.

In Figs. 13, 14, and 15 of the drawings, a further modification of the invention is shown, in which a sleeve 81 affixed to the shaft 2 is provided with a shoe supporting flange 82 at its inner end, to the peripheral portion of which is attached a rim member 83 to which is rigidly secured a tubular expansible shoe 84. The shoe 84 is of transversely elongated cross section, having a cavity which is quite shallow radially but which extends throughout the major portion of the width of the shoe. The shoe 84 is provided with a stem 85 through which liquid may be introduced into the interior of the shoe, the stem 85 being clamped to the rim 83 by means of a nut 86 and may be closed by means of a cap 87 after the liquid is introduced into the shoe. For expanding and contracting the shoe to engage and disengage the shoe with the drum, a plurality of expansible chambers 88, which may be in the form of bellows or Sylphons are mounted in the interior of the rim 83. Each of the expansible chambers has an outer head 89 secured to the interior of the rim 83 by means of a threaded stem 90 having its inner end attached to the inner tube of the shoe and having passage 91 which establishes communication between the chamber 88 and the interior of the shoe. Each of the chambers 88 has a movable head 92 at its inner end which is guided for radial movement by means of projection 93 integral with the head 92, and a guide member 94 integral with the flange 82. The heads 89 and 92 are connected by a flexible corrugated wall 95 and an interior coil spring 96 may be interposed between the heads to maintain an inward radial thrust on the inner head 92. The liquid pressure within the shoe is increased to expand the shoe into drum engaging position by simultaneously imparting radial outward movement to the movable heads 92. These heads are actuated by means of a conical flexible steel disk 97 which has arms 98 engaging the heads 92, and which has a central portion mounted on a sliding sleeve 99 as in modifications previously described.

The inflatable shoe of the present invention provides a flexible torque transmitting connection between the drum and inner rotatable member and this shoe by reason of the transversely elongated cross sectional form of the fluid chamber offers very slight resistance to small relative movements of the driving and driven members during operation. Small relative radial movements of the members connected by the shoe will not materially affect the pressure of the liquid within the shoe, and the shafts 1 and 2 may be slightly offset or may have slight angular misalignment without imposing excessive stresses on the bearings or on the clutch elements. Since the expanding medium is a body of liquid instead of a compressible fluid such as air, the relative movement of the shoe with respect to the drum in engaging and disengaging can be quite small, and the clutch may be very quickly released or applied by actuation of the shifter.

In Fig. 14 of the drawings a bearing for the shaft 2 is shown in the hub of the drum 3, the shaft 2 having a reduced end 100 which extends into a ball bearing 101 mounted in the hub of the drum. Such a bearing may in some instances be advantageous to insure accurate centering of the clutch shoe with respect to the drum. However, this feature is not essential to the invention.

In each of the modifications shown the shoe is expanded by a body of liquid acted upon by outwardly moving thrust members which press against elastic portions of the liquid confining chamber in such a way as to obtain a radial hydraulic pressure against the interior of the drum which is much greater than the applied thrust, the multiplication of pressure being due to the application of pressure to an area less than that of the tread and a radial movement of the thrust members greater than that of the tread. Also in each modification the elasticity of the walls of the liquid confining chamber permits the movement of the thrust applying members through their dead center position without any substantial decrease in pressure on the tread due to the slight retraction of the thrust members in their fully applied positions.

It is to be understood that variations and modifications of the specific devices herein shown and described for purposes of illustration, may be made without departing from the spirit of the invention.

What I claim is:

1. A clutch comprising a rotatable drum, an inner rotatable member substantially concentric with the drum, an annular fluid tight chamber which is carried by the inner rotatable member and rotatable therewith and which is filled with liquid, said chamber having side walls, a continuous exterior peripheral wall which is flexible and expansible into engagement with the interior of the drum and a flexible radially expansible interior wall portion, means for expanding said interior wall portion radially outwardly to increase the pressure within the chamber and expand said peripheral wall into engagement with the interior of the drum, and means for moving one of said side walls toward or away from the other to adjust the position of the exterior peripheral wall with respect to the drum.

2. A clutch comprising a rotatable drum, an inner rotatable member substantially concentric with the drum, a hollow annular rubber shoe mounted on said inner member, said shoe having a transversely flat peripheral tread portion adjacent the interior surface of the drum but normally spaced therefrom, said shoe having flexible torque transmitting side walls and interior base portions attached to said inner member, said shoe having an annular cavity within the tread portion and side walls which is transversely elongated in cross section and which is filled with liquid, said shoe having flexible and elastic interior wall portions, and means for moving said interior wall portions radially outwardly toward said tread to increase the pressure within said cavity and to expand said tread portion into engagement with the interior of said drum.

3. A clutch comprising a rotatable drum, an inner rotatable member substantially concentric with the drum, a hollow annular rubber shoe mounted on said inner member, said shoe having a transversely flat peripheral tread portion adjacent the interior surface of the drum but normally spaced therefrom, said shoe having flexible torque transmitting side walls and interior base portions attached to said inner member, said shoe having an annular cavity within the tread portion and side walls which is transversely elongated in cross section and which is filled with liquid, said shoe having flexible and elastic interior wall portions, means for moving said interior wall portions radially outwardly toward said tread to increase the pressure within said cavity and to expand said tread portion into engagement with the interior of said drum, and additional means for applying pressure to a flexible wall of said shoe to adjust the range of movement of said tread portion.

4. A clutch comprising a rotatable drum, an inner rotatable member substantially concentric with the drum, a hollow annular rubber shoe mounted on said inner member, said shoe having a transversely flat peripheral tread portion adjacent the interior surface of the drum but normally spaced therefrom, said shoe having flexible torque transmitting side walls and interior base portions attached to said inner member, said shoe having an annular cavity within the tread portion and side walls which is transversely elongated in cross section and which is filled with liquid, said shoe having flexible and elastic interior wall portions, an axially movable member mounted on said inner member and rotatable therewith, and means interposed between said axially movable member and said shoe for exerting a radial thrust upon said flexible interior wall portions of the shoe.

5. A clutch comprising a rotatable drum, an inner rotatable member substantially concentric with the drum, an expansible annular shoe carried by the inner member and rotatable therewith, said shoe having a peripheral portion engageable with the interior of the drum upon expansion of the shoe, an axially movable member mounted upon said inner member and rotatable therewith, angularly spaced thrust members having radially movable outer end portions engaging the annular shoe and inner end portions movable with said axially movable member from a clutch releasing position in which the thrust members are inclined with respect to a plane perpendicular to the axis of rotation to a clutch engaging position in which the thrust members are perpendicular to said axis, means for actuating said axially movable member, and means for limiting the clutch applying movement of said axially movable member and stopping said movement at a point where said thrust applying members have moved slightly past their perpendicular position whereby the pressure exerted by the shoe on said thrust members resists movement toward releasing position.

6. A clutch comprising a rotatably mounted drum, an inner rotatable member substantially concentric with the drum, a shoe comprising a fabric reinforced molded annular rubber casing and an elastic walled inner tube, said casing having a thickened expansible tread portion which is normally transversely flat and positioned adjacent to but spaced from the interior surface of the drum and relatively short torque transmitting side walls having base portions attached to said inner rotatable member, said inner tube being confined within the tread portion and side walls of said casing and being filled with liquid, and means for exerting a radial outward pressure on the inner wall of said inner tube to apply pressure to the body of liquid within the tube and to expand the said tread portion into engagement with the interior of said drum.

7. A clutch comprising a rotatably mounted drum, an inner rotatable member substantially concentric with the drum, a shoe comprising a fabric reinforced molded annular rubber casing and an elastic walled inner tube, said casing having a thickened expansible tread portion which is normally transversely flat and positioned adjacent to but spaced from the interior surface of the drum and relatively short torque transmitting side walls having base portions attached to said inner rotatable member, said inner tube being confined within the tread portion and side walls of said casing and being filled with liquid, means for exerting a radial outward pressure on the inner wall of said inner tube to apply pressure to the body of liquid within the tube and to expand the said tread portion into engagement with the interior of said drum, and means for pressing one of the side walls of said casing toward the other to adjust the position of said tread with respect to the drum.

8. A clutch comprising a drum, an expansible shoe within the drum, means for normally supporting said shoe out of engagement with the drum, including a shaft concentric with the drum and a driving connection between said shaft and shoe and means for radially expanding said shoe into engagement with the drum comprising a member movable axially along said shaft and thrust members connected to the shoe and member, said axially movable member being movable from a shoe releasing position in which the thrust members are inclined with respect to a plane perpendicular to the shaft to a clutch engaging position in which the thrust members are oppositely inclined with respect to said plane but at a lesser angle.

9. A clutch for connecting a driving shaft and an axially aligned driven shaft, one of said shafts having a drum rotatable therewith and the other of said shafts having an annular expansible shoe engageable with said drum, and means for expanding said shoe into engagement with said drum, comprising a shifter slidably mounted on the shoe carrying shaft, thrust members connected at their inner ends to said shifter and at their outer ends to said shoe, said shifter being movable from a disengaging position in which said thrust members are inclined to a plane perpendicular to the shaft axis to an engaging position in which the thrust members are oppositely inclined with respect to said plane but at a lesser angle.

10. A clutch comprising a rotatable drum, an inner rotatable member concentric with the drum, an annular radially expansible shoe within the drum and attached to the inner rotatable member, means for expanding said shoe into engagement with the interior of said drum comprising an axially movable member coaxial with the shoe and rotatable therewith, and spaced rocking thrust members having outer radially movable end portions for exerting a radial outward pressure on the shoe and inner end portions movable with the axially movable member, said axially movable member being movable inwardly from a clutch releasing position in which said thrust members are inclined to a plane perpendicular to the axis, to a clutch engaging position in which said thrust members are substantially at right angles to the axis, a stop for limiting the inward movement of said member so positioned as to permit movement of the thrust members slightly past the perpendicular position, and means for actuating said axially movable member.

11. A clutch comprising a rotatable drum, an inner rotatable member concentric with the drum, an annular radially expansible shoe within the drum and attached to the inner rotatable member, means for expanding said shoe into engagement with the interior of said drum comprising an axially movable member coaxial with the shoe and rotatable therewith, and an expanding member comprising a spring metal disk of conical form having a central portion movable axially with said axially movable member and radiating arms which are normally disposed at an inclination to a plane perpendicular to the axis and which are connected to the shoe at their outer ends and held against axial movements whereby outer ends of said arms are moved radially outward upon inward axial movement of said member, a stop for limiting the inward movement of said member so positioned as to permit movement of said arms slightly past the perpendicular position, and means for actuating said axially movable member.

12. A clutch comprising a rotatable drum, an inner rotatable member substantially concentric with the drum, an annular fluid tight chamber carried by the inner rotatable member and rotatable therewith, said chamber being filled with liquid and having a continuous exterior peripheral wall which is flexible and expansible into engagement with the interior of said drum, said chamber having a radially movable interior wall portion of an area less than that of the tread, and means for moving said interior wall portion radially outwardly to create pressure in the body of liquid to expand the exterior peripheral wall into engagement with the drum and to exert a pressure on the drum greater than that applied to said inner wall.

13. A clutch comprising a rotatable drum, an inner rotatable member substantially concentric with the drum, an annular fluid tight chamber carried by the inner rotatable member and rotatable therewith, said chamber being filled with liquid and having a continuous exterior peripheral wall which is flexible and expansible into engagement with the interior of said drum, said chamber having a flexible and elastic interior wall, and means for expanding a central portion of said elastic and flexible interior wall.

HERMAN T. KRAFT.